(12) United States Patent
Krybus et al.

(10) Patent No.: US 12,433,539 B2
(45) Date of Patent: Oct. 7, 2025

(54) DENTAL SENSOR SYSTEM FOR MOUNTING A DENTAL SENSOR

(71) Applicant: Ivoclar Vivadent AG, Schaan (LI)

(72) Inventors: Robert Wolfgang Krybus, Malans (CH); Florian Moosmann, Zwischenwasser (AT)

(73) Assignee: Ivoclar Vivadent AG, Schaan (LI)

( * ) Notice: Subject to any disclaimer, the term of this patent is extended or adjusted under 35 U.S.C. 154(b) by 384 days.

(21) Appl. No.: 17/588,441

(22) Filed: Jan. 31, 2022

(65) Prior Publication Data

US 2022/0240857 A1 Aug. 4, 2022

(30) Foreign Application Priority Data

Feb. 3, 2021 (EP) .................................. 21155035

(51) Int. Cl.
*A61B 5/00* (2006.01)

(52) U.S. Cl.
CPC ............ *A61B 5/6838* (2013.01); *A61B 5/682* (2013.01)

(58) Field of Classification Search
CPC ...... A61B 5/682; A61B 5/6838; A61B 5/0088
USPC ........................................................ 433/25
See application file for complete search history.

(56) References Cited

U.S. PATENT DOCUMENTS

| | | | |
|---|---|---|---|
| 2006/0166157 A1 | 7/2006 | Rahman et al. | |
| 2008/0070181 A1* | 3/2008 | Abolfathi | H04R 25/606 433/25 |
| 2011/0066066 A1* | 3/2011 | Van Kemenade | A61F 5/566 600/546 |
| 2012/0225398 A1* | 9/2012 | Fallah | A61C 7/20 433/8 |
| 2015/0064640 A1* | 3/2015 | Nobrega | A61C 7/008 433/2 |
| 2015/0105665 A1* | 4/2015 | Kim | A61B 8/085 600/463 |
| 2015/0182299 A1* | 7/2015 | Koubi | A61C 1/0007 901/41 |
| 2015/0216641 A1* | 8/2015 | Popa-Simil | A61C 19/04 433/8 |
| 2015/0230885 A1* | 8/2015 | Wucher | A61C 7/002 433/2 |
| 2017/0105817 A1* | 4/2017 | Chun | A61C 7/28 |
| 2017/0128168 A1* | 5/2017 | Bindayel | A61C 7/14 |
| 2017/0304024 A1 | 10/2017 | Nóbrega et al. | |

(Continued)

FOREIGN PATENT DOCUMENTS

| | | | | |
|---|---|---|---|---|
| CN | 104921833 A | 9/2015 | | |
| FR | 2036992 A1 * | 4/1969 | ............. | A61C 1/082 |

(Continued)

OTHER PUBLICATIONS

FR 2990129 machine translation (Year: 2013).*
JP 2021146199 Machine translation (Year: 2021).*
Translation of KR-102400437 (Year: 2022).*

*Primary Examiner* — Heidi M Eide
(74) *Attorney, Agent, or Firm* — Ann M. Knab; Thad McMurray (57) ABSTRACT

A dental sensor system (100), including a first tooth attachment device (101-1) for attachment to a first tooth (103-1); a second tooth attachment device (101-2) for attachment to a second tooth (103-2); a sensor rail (105) between the first and second tooth attachment devices (101-1; 101-2); and a dental sensor (107) positionable along the sensor rail (105).

12 Claims, 5 Drawing Sheets

(56) References Cited

U.S. PATENT DOCUMENTS

| | | | |
|---|---|---|---|
| 2018/0014916 A1* | 1/2018 | Cinader, Jr. | A61C 7/146 |
| 2018/0049847 A1* | 2/2018 | Oda | A61C 7/30 |
| 2018/0344436 A1* | 12/2018 | Kang | A61C 9/008 |
| 2018/0368936 A1* | 12/2018 | Habeb | A61C 3/02 |
| 2019/0167386 A1* | 6/2019 | Raghavan | A61B 5/14542 |
| 2019/0223751 A1 | 7/2019 | Weinstein et al. | |
| 2020/0138553 A1* | 5/2020 | Fan | A61B 1/24 |
| 2020/0281701 A1 | 9/2020 | Kim | |

FOREIGN PATENT DOCUMENTS

| | | | | |
|---|---|---|---|---|
| FR | 2990129 A1 * | 11/2013 | | A61B 5/0088 |
| JP | 2012125455 A * | 7/2012 | | |
| JP | 2021146199 A * | 9/2021 | | A61B 5/0002 |
| KR | 102400437 B1 * | 5/2022 | | A61C 17/12 |
| WO | WO-2007140367 A2 * | 12/2007 | | A61C 8/0098 |
| WO | WO-2020160621 A1 * | 8/2020 | | A61B 5/0004 |
| WO | WO-2021010097 A1 * | 1/2021 | | A61C 19/04 |

\* cited by examiner

DENTAL SENSOR SYSTEM FOR MOUNTING A DENTAL SENSOR

CROSS-REFERENCE TO RELATED APPLICATIONS

This application claims priority to European patent application No. 21155035.5 filed on Feb. 3, 2021, the disclosure of which is incorporated herein by reference in its entirety.

TECHNICAL FIELD

The present invention relates to a dental sensor system for mounting a dental sensor, a dental sensor mounting device, a dental sensor, and a method for positioning a dental sensor.

BACKGROUND

Various intraoral attachment options for dental sensors are currently known. For example, molar bands exist which accommodate a measuring device for determining a pH value. These are attached to a molar by means of cementation. In addition, crowns are known which include integrated measuring devices. In this case, however, the crown must be removed from the tooth for replacement of the dental sensor. Furthermore, there are approaches that for teeth supported by an implant, the measuring device is attached in an abutment. In these devices, however, the dental sensor cannot be easily replaced on the one hand. On the other hand, the measurement can only be carried out at one point.

US20170304024, 20190223751, 20150230885 and 20150064640 are directed to intraoral and/or orthodontic devices and are hereby incorporated by reference in their entirety.

SUMMARY

It is the technical aim of the present invention to enable flexible positioning of a dental sensor within an oral cavity.

This task is solved by objects according to the independent claims. Technically advantageous embodiments are the subject of the dependent claims, the description and the drawings.

According to a first aspect, the technical problem is solved by a dental sensor system comprising a first tooth attachment device for attachment to a first tooth; a second tooth attachment device for attachment to a second tooth; a sensor rail between the first and second tooth attachment devices; and at least one dental sensor positionable along the sensor rail. This provides the technical advantage that the at least one dental sensor can be positioned anywhere along the sensor rail. By means of the sensor rail, the position of the at least one dental sensor can be freely selected and adjusted as required. A distance-true and repeatable measurement is achieved. The at least one dental sensor can be moved manually or with a tongue, for example.

In a technically advantageous embodiment of the dental sensor system, the first and/or second tooth attachment devices are formed by a tooth attachment. This provides the technical advantage, for example, that the dental sensor system can be placed on the teeth and has a good hold.

In a further technically advantageous embodiment of the dental sensor system, the at least one dental sensor can be moved along the sensor rail. This provides the technical advantage, for example, that the dental sensor can be moved to different positions along the sensor rail even after initial positioning without having to remove the dental sensor from the sensor rail.

In a further technically advantageous embodiment of the dental sensor system, the sensor rail can be attached to the first and/or the second tooth attachment device. This provides the technical advantage, for example, that the sensor rail can be retrofitted to the tooth mounting devices.

In a further technically advantageous embodiment of the dental sensor system, the first and/or second tooth attachment device comprises a ball head for attaching the sensor rail. This achieves, for example, the technical advantage that the sensor rail can be additionally rotated and spatially adjusted.

In a further technically advantageous embodiment of the dental sensor system, the dental sensor can be placed or clicked onto/into the sensor rail. This has the technical advantage, for example, that the dental sensor can be attached quickly and easily.

In a further technically advantageous embodiment of the dental sensor system, the sensor rail comprises a first groove section and/or a second groove section for guiding the dental sensor.

This achieves, for example, the technical advantage that the dental sensor can be guided along the sensor rail in a simple manner.

In a further technically advantageous embodiment of the dental sensor system, the dental sensor comprises an elastic strip for insertion between the first and/or the second groove section.

This achieves, for example, the technical advantage that the position of the dental sensor is additionally stabilized.

In a further technically advantageous embodiment of the dental sensor system, the sensor rail comprises a through opening towards the dentition or gums. This provides the technical advantage, for example, that the dental sensor can take measurements directly in the area of the dentition or gums.

In a further technically advantageous embodiment of the dental sensor system, the sensor rail comprises a tooth profile for engaging the dental sensor. This achieves, for example, the technical advantage of preventing slipping or unintentional movement of the dental sensor.

In a further technically advantageous embodiment of the dental sensor system, the dental sensor comprises a drive device for moving the dental sensor along the sensor rail. This has the technical advantage, for example, that the dental sensor can independently move to different positions on the sensor rail.

In a further technically advantageous embodiment of the dental sensor system, the sensor system comprises a voltage supply device and/or a data transmission device for the dental sensor. The data transmission device can be formed, for example, by a Bluetooth interface or an NFC interface (NFC-Near Field Communication) so that acquired data can be transmitted externally from the dental sensor and evaluated externally. This achieves the technical advantage, for example, that the dental sensor can be supplied with electrical power along the sensor rail and data can be evaluated externally.

According to a second aspect, the technical problem is solved by a dental sensor attachment device, comprising a first tooth attachment device for attachment to a first tooth; a second tooth attachment device for attachment to a second tooth; and a sensor rail between the first and second tooth attachment devices, on which a dental sensor is positionable.

Thereby, the same technical advantages are achieved as by the dental sensor system according to the first aspect.

According to a third aspect, the technical problem is solved by a dental sensor for a dental sensor mounting device according to the second aspect. Thereby, the same technical advantages are achieved as by the dental sensor system according to the first aspect.

According to a fourth aspect, the technical problem is solved by a method for positioning a dental sensor, comprising the steps of attaching a dental sensor attachment device comprising a first tooth attachment device to a first tooth and a second tooth attachment device to a second tooth; and positioning a dental sensor on a sensor rail between the first tooth attachment device and the second tooth attachment device. Thereby, the same technical advantages are achieved as by the dental sensor system according to the first aspect.

According to a fifth aspect, the technical task is solved by using a sensor rail between a first tooth attachment device and a second tooth attachment device for positioning a dental sensor. Thereby, the same technical advantages are achieved as by the dental sensor system according to the first aspect.

BRIEF DESCRIPTION OF THE DRAWINGS

Examples of embodiments of the invention are shown in the drawings and are described in more detail below wherein.

DETAILED DESCRIPTION

Figure 1:
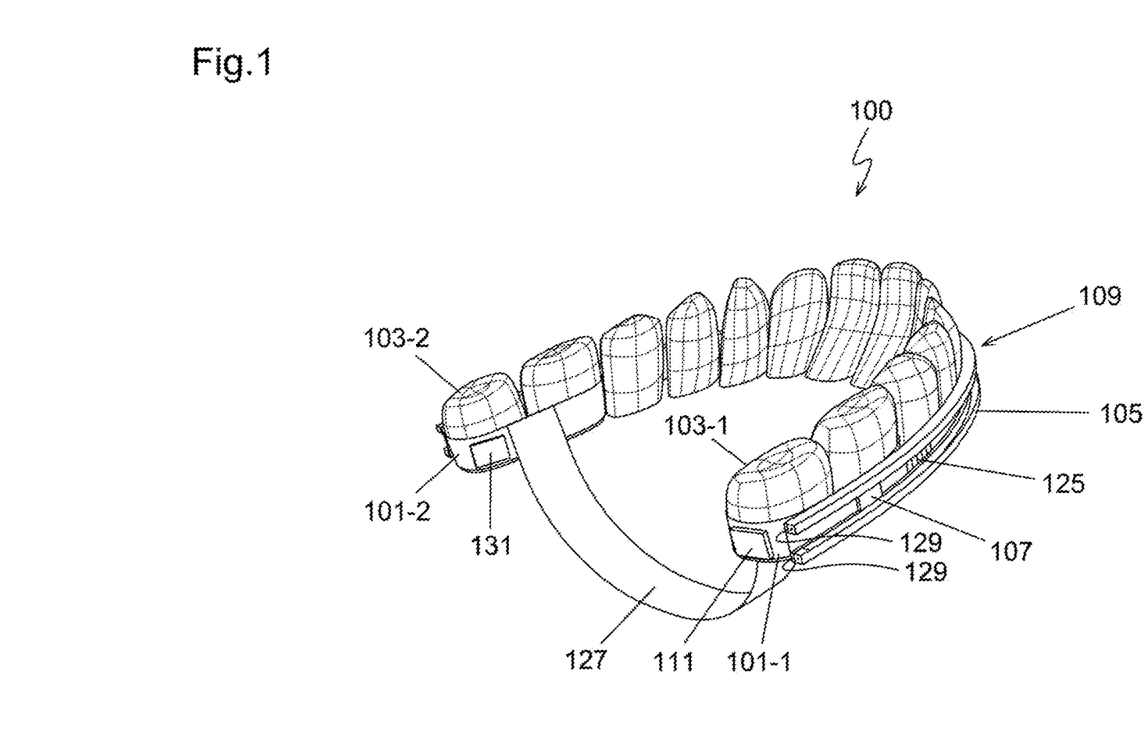
FIG. 1 shows a schematic view of a dental sensor system.

FIG. 1 shows a schematic view of a dental sensor system 100. The dental sensor system 100 includes a first tooth attachment device 101-1 for attachment to one or more first teeth 103-1, a second tooth attachment device 101-2 for attachment to one or more second teeth 103-2, a sensor rail 105, and one or more dental sensors 107.

The tooth attachment devices 101-1 and 101-2 are formed, for example, by corresponding molded plastic caps as tooth attachments that can be placed on the respective teeth. The plastic caps are formed, for example, by individually printed molar attachments that have been manufactured using an additive or subtractive process. The tooth attachment devices 101-1 and 101-2 may also be formed to be attached to an adhesive, an abutment, an implant attachment, and/or a tensioning splint.

The tooth attachment devices 101-1 and 101-2 are optionally connected to each other by a bracket 127.

A sensor rail 105, on which one or more dental sensors 107 are positionable and interchangeably mounted, is disposed between the tooth attachment devices 101-1 and 101-2. The sensor rail 105 is provided for the individual dental arch. The dental attachment devices 101-1 and 101-2 and/or the sensor rail 105 may be individually additively or subtractively manufactured from a suitable material, such as plastic. The sensor rail 105 may be made of a resilient material such that it conforms to the dental arch and remains easily movable. One of a plurality of dental sensors 107 may be slidably guided in the sensor rail 105. However, individual slots with click elements may also be provided in the sensor rail 105 to attach the dental sensors 107 to the sensor rail 105. If multiple dental sensors 107 are used, an area with locks or with segments may be established on the sensor rail 105 for each dental sensor 107. The sensor rail 105 may also include a tooth profile 125 that extends along the sensor rail 105. Individual dental sensors 107 may engage the tooth profile 125. Therefore, the tooth profile 125 may be used to lock the dental sensors 107 in position. The tooth profile 125 may also serve as an engagement for a corresponding gear of a drive device to move the dental sensor 107 along the sensor rail 105.

The sensor rail 105 can extend over the entire dental arch, above or below a dental arch, so that the tooth areas are freely accessible. In addition, the sensor rail may also comprise the gum or only contact the gum. The sensor rail 105 can be arranged individually or together with another sensor rail 105 in the labial or lingual region.

The tooth attachment devices 101-1 and 101-2 and the sensor rail 105 together form a dental sensor attachment device 109. A voltage supply device 111, such as a battery, may be provided or integrated in the tooth attachment device 101-1 and 101-2 or the bracket 127. The electrical voltage provided by the voltage supply device 111 may be supplied to the respective dental sensor 107 via two electrical conductors 129. The electrical conductors 129 run separately along the sensor rail 105, allowing electrical power to be supplied to the dental sensor 107 at each location.

A data transmission device 131 may also be provided in the bracket 127 or in the tooth attachment devices 101-1 and 101-2. Through the data transmission device 131, the data that has been acquired by the dental sensor 107 can be wirelessly transmitted to the outside. In addition, control data for the respective dental sensor 107 can be received. For this purpose, the data transmission device 131 comprises a suitable electronic circuit.

The dental sensor 107 is movable along the sensor rail 105. The dental sensor 107 may be, for example, a sensor designed to measure a pH value, an ethanol concentration, a lactate concentration, a cortisol concentration, a glucose concentration, an ion concentration, to measure sound waves when biting together, and/or a sensor designed to measure a temperature. For this purpose, the dental sensor 107 comprises suitable electronic circuits, which may be arranged on flexible printed circuit boards with their own power supply.

Figure 2:
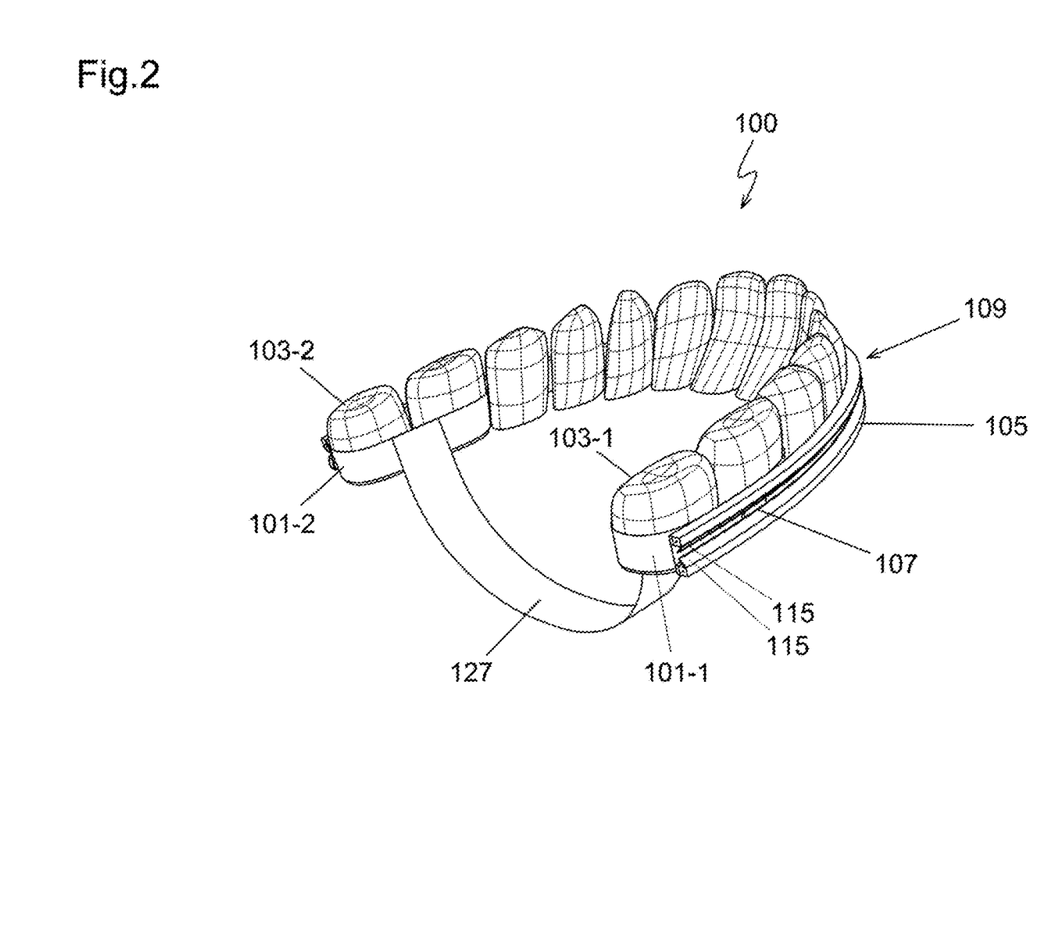
FIG. 2 shows another schematic view of the dental sensor system.

FIG. 2 shows another schematic view of the dental sensor system 100. The sensor rail 105 may include inwardly extending sealing lips 115 that serve to prevent fluid contact with electrical conductors 129 that extend within the groove sections. The sealing lips 115 also extend along the sensor rail 105 and are formed of an elastic material. The sealing lips 115 are disposed on the outside of the groove sections and extend diagonally into the space between the two groove sections.

Figure 3:
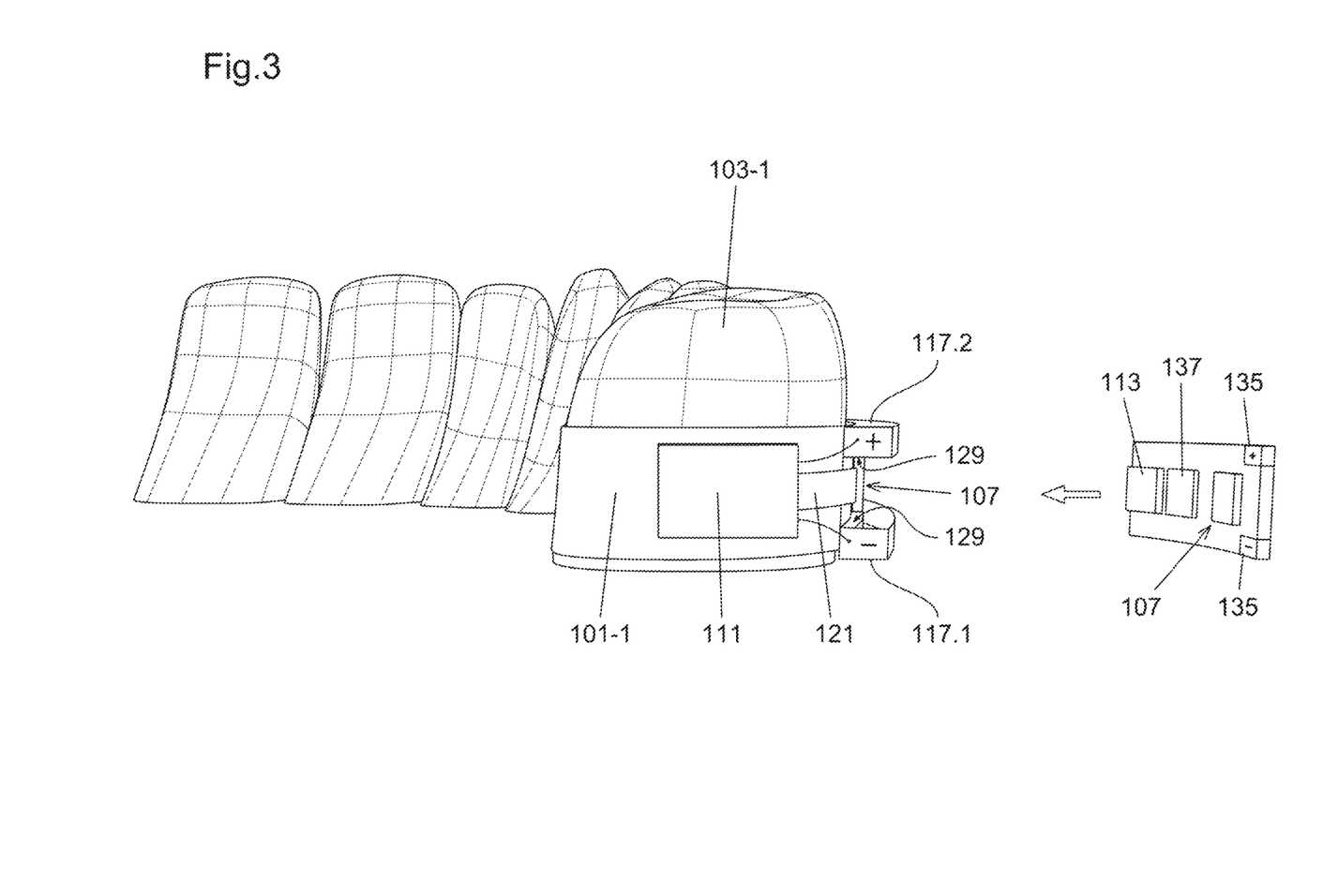
FIG. 3 shows another schematic view of the dental sensor system.
Figures 4A, 4B:
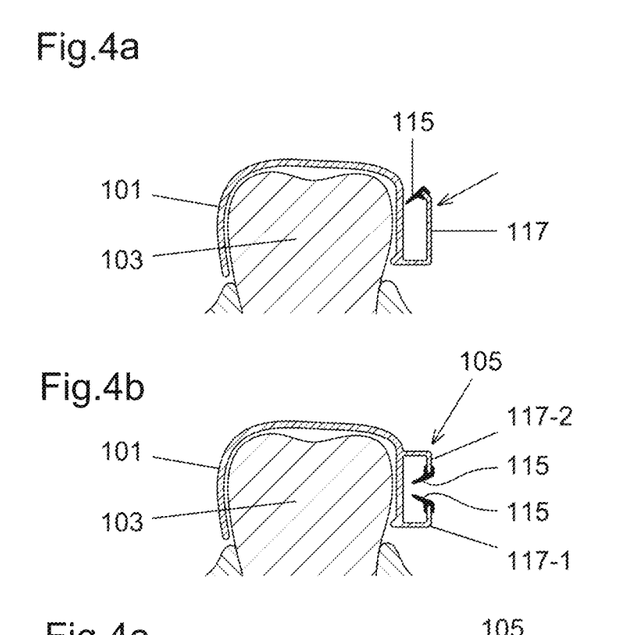
FIG. 4a shows an embodiment of a sensor rail.
FIG. 4b shows another embodiment of the sensor rail.
Figure 4C:
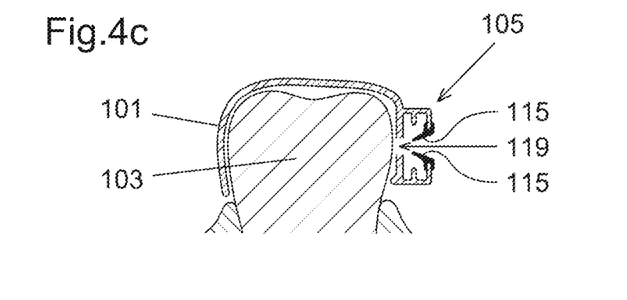
FIG. 4c shows a further embodiment of the sensor rail.
Figure 4D:
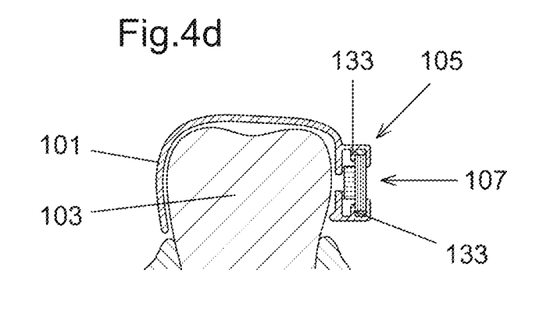
FIG. 4d shows yet another embodiment of the sensor rail.
Figure 4E:
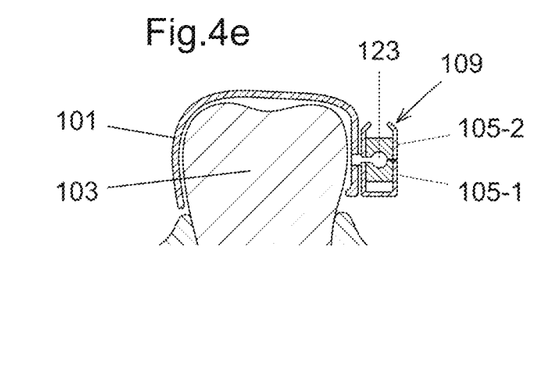
FIG. 4e shows still another embodiment of the sensor rail.

FIG. 3 shows another schematic view of the dental sensor system 100. The sensor rail 105 includes a first groove section 117-1 and a second opposing groove section 117-2 for guiding and holding the dental sensor 107. The dental sensor 107 is held between the two groove sections 117-1 and 117-2 and guided in a longitudinal direction.

The dental sensor 107 may be attached to an elastic strip 121 held between the first and/or second grooves or groove portions 117-1, 117-2. By miniaturizing the dental sensor 107, a wearing comfort can be increased. For example, the dental sensor 107 is formed as a thin patch.

The electrical conductors 129 may be integrated into the sensor rail 105 and extend across the entire arc, or may be provided by means of the elastic strip 121. The dental sensor 107 includes two contact pads 135 that engage the respective electrical conductor 129. This provides electrical power to the dental sensor 107 to perform the measurement. An electronic system 137 is used to acquire measurement data. The electronics 137 and electrical conductors 129 can also be manufactured using an additive manufacturing process.

The dental sensor 107 may include a drive device 113, such as an electric micromotor, that advances the dental sensor 107 along the sensor rail 105. For this purpose, the drive device 113 of the dental sensor 107 may engage the tooth profile along the sensor rail 105. The drive device 113 can autonomously move the dental sensor 107 to different positions on the sensor rail 105.

The sensor rail 105 may be detachably attachable to the first and/or second tooth attachment devices 101-1 and 101-2. In this case, the tooth attachment devices 101-1 and 101-2 can first be attached in the oral cavity without the sensor rail 105. Once these are in the desired position, the sensor rail 105 is then attached to them.

For this purpose, the tooth attachment devices 101-1 and 101-2 may include a plug-in or click mechanism as a connecting element. The plug-in or click mechanism may be formed by a rail notch and/or an expanding element arranged on the sensor rail 105 or the tooth attachment devices 101-1 and 101-2. This element may allow the sensor rail 105 to be inserted and provide a secure fit, and may be inserted or clicked into an opposing device.

FIG. 4 shows different embodiments of the sensor rail 105. The sensor rail 105 can be pocket-shaped open at the top so that the dental sensor 107 can be inserted from above (top). However, the sensor rail 105 may also include upper and lower groove sections 117-1 and 117-2 by which the dental sensor 107 is held (middle).

In addition, the sensor rail 105 may also include a through opening 119 to the dentition through which direct measurement, particularly of saliva flow, to the teeth 103 and/or gums by the dental sensor 107 is enabled. The through opening 119 extends, for example, along the length of the sensor rail 105 so that the dental sensor 107 can make direct measurements to the teeth at any point along the sensor rail 105.

Other embodiments that assist saliva flow, such as saliva flow channels, gingival to occlusal or occlusal to gingival may also be provided in the sensor rail 105. In addition, the sensor rail 105 may include a tooth profile 125 for engaging the dental sensor 107. This may stabilize the dental sensor 107 along the sensor rail 105 and prevent slippage or inadvertent movement of the dental sensor 107.

The sensor rail 105 may have grooves that include electrical conductors 129 and sealing lips 115 for covering the electrical conductors 129. The grooves containing electrical conductor 129 may serve to bridge a power supply or as data lines. The electrical conductors 129 are powered by a power supply device 111 for the electronics of the dental sensor 107.

The dental sensor 107 may include a drive device 113, such as a micromotor, for autonomously moving the dental sensor 107 along the sensor rail 105.

Spacer elements 133 are used to ensure that the dental sensor 107 remains positioned at a defined distance from the tooth 103 along the sensor rail 105 (below). The spacer elements 133 are formed by a support area that runs around the sensor rail 105 and supports the dental sensors 107.

Precise positioning of the dental sensor 107 can be performed, for example, by means of GPS. It is also conceivable that an image of the sensor rail 105 is displayed to the user by means of a smartphone and the dental sensor 107 can be set in the arranged position on the image.

The first and/or second tooth attachment device 101-1 and/or 101-2 may also include a ball head 123 for attaching the sensor rail 105. This arrangement also allows for subsequent adjustment of the sensor rail 105 by rotation about the mounting points.

The ball head 123 forms a connecting element that allows the sensor mounting device 109 to be clamped when the positioning device is mated together by first passing the lower sensor rail 105 and then the upper sensor rail after positioning the dental sensor 107.

The sensor rails 105 are not necessarily elastic. This allows the dental sensor 107 to be inserted between the sensor rails 105 at a desired position.

The dental sensor 107 may include a resilient sleeve and thus be positioned within a rather rigid sensor rail 105. The sensor rail 105 may include an end piece and the dental sensor 107 may be slid laterally into the sensor rail. The upper and lower sensor rails 107 are connected to each other at both or one end, for example. The rail strands could be made in one piece and connected by one or two attachable end pieces. Negatively pronounced geometries can be provided on the end pieces, which can be connected with a connecting element, such as a ball head. However, different connecting elements are also conceivable.

Figure 5:
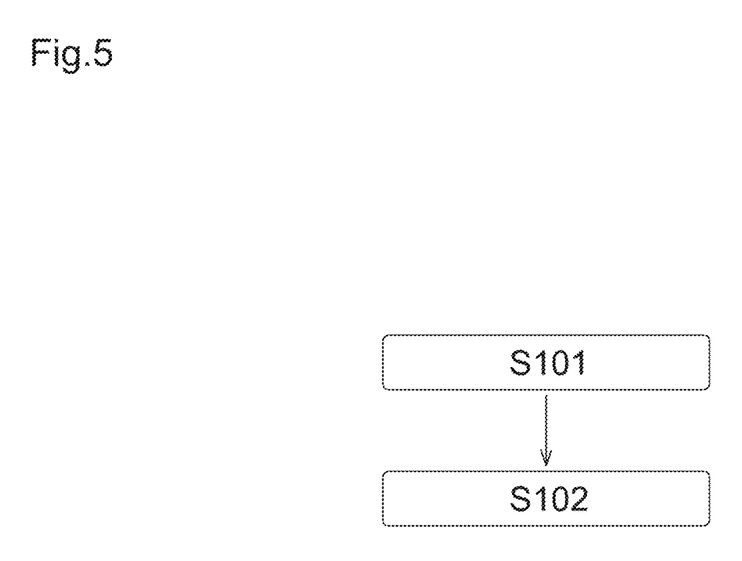
FIG. 5 shows a block diagram of a method for positioning a dental sensor.

FIG. 5 shows a block diagram of a method for positioning a dental sensor 107. The method includes the step S101 of attaching the dental sensor attachment device 109 with the first tooth attachment device 101-1 to the first tooth 103-1 and the second tooth attachment device 101-2 to the second tooth 103-2. In step S102, the dental sensor 107 is attached to the sensor rail 105 between the first tooth attachment device 101-1 and the second tooth attachment device 101-2 and a measurement is made by the dental sensor 107.

The dental sensor system 100 provides higher degrees of freedom for the measurement. If measurements are to be taken at several measuring points, the number of dental sensors can be reduced, since measurements can be taken at different measuring points with a single dental sensor. An individual sensor rail 105 can be used, with which a labial or lingual measurement option is created. A removable measuring device will be realized, in which individual parts can be easily replaced or adapted. Overall, the dental sensor system 100 forms an easily attachable and swallow-proof dental fixation of dental sensors 107.

Individual dental sensors 107 can be activated and deactivated with the tongue by pressing the respective dental sensor 107 with the tongue. The activation and deactivation of the dental sensor 107 can also be performed using a smartphone.

All features explained and shown in connection with individual embodiments of the invention may be provided in different combinations in the subject matter of the invention to simultaneously realize their beneficial effects. Any of the elements that form part of the invention are not limited to examples herein and may include those which are understood or known to one of ordinary skill in the art.

All method steps can be implemented by devices which are suitable for executing the respective method step. All functions that are executed by the features in question can be a method step of a method.

The scope of protection of the present invention is given by the claims and is not limited by the features explained in the description or shown in the figures.

REFERENCE LIST

100 Dental sensor system
101 Tooth mounting device or fastener
103 Tooth
105 Sensor rail
107 Dental sensor
109 Sensor mounting device
111 Voltage supply device or power supply
113 Drive device or actuator
115 Sealing lip
117 Groove section
119 Passage opening
121 Elastic strip
123 Ball head
125 Tooth profile
127 Hanger
129 Electrical conductor
131 Data transmission device or data transmitter
133 Spacer elements
135 Contact surfaces
137 Electronics

The invention claimed is:

1. A dental sensor system (100), comprisesing:
a first tooth fastener (101-1) comprising a first cap for placement on a first tooth (103-1);
a second tooth fastener (101-2) comprising a second cap for placement on a second tooth (103-2), wherein the first cap and the second cap are separate from one another;
a sensor rail (105) between the first and second tooth fasteners (101-1; 101-2) and configured to be positioned along an entire dental arch below occlusal surfaces of the teeth on a lower dental arch or above the occlusal surfaces of the teeth on an upper dental arch along a labial or lingual surface of the teeth;
at least one dental sensor (107) that is displaceable along the sensor rail (105); and
wherein the sensor rail (105) comprises one or two grooves (117-1; 117-2) for guiding the dental sensor (107).

2. The dental sensor system (100) according to claim 1, wherein the sensor rail (105) is attachable to the first and/or the second tooth fastener (101-1, 101-2).

3. The dental sensor system (100) according to claim 2, wherein the first and/or second tooth fastener (101-1, 101-2) comprises a ball head (123) for attaching the sensor rail (105).

4. The dental sensor system (100) according to claim 1, wherein the dental sensor (107) is adapted for placement on or snapping onto the sensor rail (105).

5. The dental sensor system (100) according to claim 1, wherein the dental sensor (107) comprises an elastic strip (121) for insertion within the one groove or between the two grooves (117-1, 117-2).

6. The dental sensor system (100) according to claim 1, wherein the sensor rail (105) comprises a through opening (119) towards the dentition and/or a tooth profile (125) for engaging the dental sensor (107).

7. The dental sensor system (100) according to claim 1, wherein the dental sensor (107) comprises an actuator (113) for moving the dental sensor (107) along the sensor rail (105).

8. The dental sensor system (100) according to claim 1, wherein the sensor system (100) comprises a power supply (111) and/or a data transmitter (131) for the dental sensor (107).

9. The dental sensor system (100) according to claim 1, wherein the sensor rail (105) extends from the first tooth fastener (101-1) to the second tooth fastener (101-2).

10. A dental sensor system, comprising:
a first tooth fastener (101-1) comprising a first cap for placement on a first tooth (103-1);
a second tooth fastener (101-2) comprising a second cap for placement on a second tooth (103-2), wherein the first cap and the second cap are separate from one another;
a sensor rail (105) between the first and second tooth fasteners (101-1; 101-2) and configured to be positioned along an entire dental arch below occlusal surfaces of the teeth on a lower dental arch or above the occlusal surfaces of the teeth on an upper dental arch along a labial or lingual surface of the teeth;
wherein the sensor rail (105) comprises one or two grooves (117-1; 117-2) for guiding a dental sensor (107); and wherein the sensor rail is configured for a dental sensor to be displaceable along the sensor rail (105);
a dental sensor; and
a fastener for the dental sensor comprises an elastic strip (121) for insertion within the one groove or between the two grooves (117-1, 117-2).

11. A method of positioning a dental sensor (107), comprising the steps of:
providing a dental sensor fastener (109) having a first tooth fastener (101-1) comprising a first cap for placement on a first tooth, a second tooth fastener (101-2) comprising a second cap for placement on a second tooth, wherein the first cap and the second cap are separate from one another, and a sensor rail (105) configured for positioning along an entire dental arch below occlusal surfaces of the teeth on a lower dental arch or above the occlusal surfaces of the teeth on an upper dental arch along a labial or lingual surface of the teeth;
attaching (S101) the dental sensor fastener (109) by attaching the first tooth fastener (101-1) to the first tooth (103-1) and attaching the second tooth fastener (101-2) to the second tooth (103-2);
positioning (S102) a dental sensor (107) on the sensor rail (105) between the first tooth fastener (101-1) and the second tooth fastener (101-2), wherein the dental sensor is displaceable along the sensor rail; and
wherein the sensor rail (105) comprises one or two grooves (117-1; 117-2) for guiding the displaceable dental sensor (107) along the sensor rail (105).

12. A method of using a sensor rail (105) configured for being positioned along an entire dental arch below occlusal surfaces of teeth on a lower dental arch or above occlusal surfaces of the teeth on an upper dental arch along a labial or lingual surface of the teeth between a first tooth fastener (101-1) comprising a first cap for placement on a first tooth and a second tooth fastener (101-2) comprising a second cap for placement on a second tooth to position a displaceable dental sensor (107) comprising positioning the displaceable dental sensor (107) on the sensor rail (105) between the first tooth fastener (101-1) and the second tooth fastener (101-2), wherein the first cap and the second cap are separate from one another;

wherein the sensor rail (105) comprises one or two grooves (117-1; 117-2) for guiding the displaceable dental sensor (107) along the sensor rail (105).

\* \* \* \* \*